United States Patent
Gu et al.

(10) Patent No.: US 7,580,422 B2
(45) Date of Patent: Aug. 25, 2009

(54) INTERNET PROTOCOL PHONE SYSTEM AND CONTROL METHOD FOR INTERNET PROTOCOL PHONE SYSTEM

(75) Inventors: Yu Gu, Tama (JP); Hitoshi Yamakado, Hino (JP); Toru Miyamoto, Hachiohji (JP)

(73) Assignee: Seiko Epson Corporation, Tokyo (JP)

( * ) Notice: Subject to any disclaimer, the term of this patent is extended or adjusted under 35 U.S.C. 154(b) by 998 days.

(21) Appl. No.: 11/072,969

(22) Filed: Mar. 7, 2005

(65) Prior Publication Data

US 2005/0207401 A1 Sep. 22, 2005

(30) Foreign Application Priority Data

Mar. 18, 2004 (JP) ............................. 2004-078293

(51) Int. Cl.
*H04J 3/16* (2006.01)
(52) U.S. Cl. ...................... 370/466; 370/352; 709/245
(58) Field of Classification Search ................ 370/352, 370/338, 349, 389, 395.52, 471, 400, 401; 709/230, 245
See application file for complete search history.

(56) References Cited

U.S. PATENT DOCUMENTS

| 6,456,625 | B1 | 9/2002 | Itoi et al. | |
| 6,807,166 | B1 | 10/2004 | Ohura | |
| 2003/0193921 | A1* | 10/2003 | Kim | 370/338 |
| 2004/0028028 | A1* | 2/2004 | Kwak | 370/352 |
| 2004/0047631 | A1 | 3/2004 | Takatori et al. | |

FOREIGN PATENT DOCUMENTS

| CN | 1411220 A | 4/2003 |
| JP | A-11-122285 | 4/1999 |
| JP | A 2000-059415 | 2/2000 |
| JP | 2001-156852 | 6/2001 |
| JP | A 2001-333111 | 11/2001 |
| JP | A-2002-141861 | 5/2002 |
| JP | A 2003-163700 | 6/2003 |
| JP | A 2004-048235 | 2/2004 |
| WO | WO 02/098085 A1 | 12/2000 |

* cited by examiner

Primary Examiner—Creighton Smith
(74) Attorney, Agent, or Firm—Oliff & Berridge, PLC (57) ABSTRACT

An internet protocol phone system having a plurality of internet protocol networks which are provided with internet protocol address systems in which local internet protocol addresses and global internet protocol addresses differ, and are mutually connected, and an internet protocol address translation device which is connected to the local internet protocol network, gives the local internet protocol address and the global internet protocol address to an internet protocol phone device, and obtains the local internet protocol address and the global internet protocol address from the internet protocol phone device, in which when it is detected that the internet protocol phone device which is connected to the local internet protocol network enters a calling state, the internet protocol address translation device gives the global internet protocol address to the internet protocol phone device thereof, and when it is detected that the call of the internet protocol phone device is finished, the internet protocol address translation device obtains the global internet protocol address from the internet protocol phone device.

7 Claims, 6 Drawing Sheets

| FORMAT OF LOCAL IP ADDRESS POOL | |
|---|---|
| LOCAL IP ADDRESS | USING STATE |
| FOR EXAMPLE:<br>10.1.2.3 | 0: UNUSED<br>1: BUSY |

FIG. 2B

| FORMAT OF GLOBAL IP ADDRESS POOL | |
|---|---|
| GLOBAL IP ADDRESS | USING STATE |
| FOR EXAMPLE:<br>123.123.123.123 | 0: UNUSED<br>1: BUSY |

FIG. 3

| FORMAT OF "PHONE NUMBER vs. IP ADDRESS" LOOK-UP TABLE | | |
|---|---|---|
| PHONE NUMBER | LOCAL IP ADDRESS | GLOBAL IP ADDRESS |
| FOR EXAMPLE:<br>0501234568 | FOR EXAMPLE:<br>10.1.1.1 | 0.0.0.0 or<br>123.123.123.123. |

MESSAGE FORMAT

| | PARTY IP ADDRESS | CALLER IP ADDRESS | COMMAND ID | DATA ATTACHED TO COMMAND |
|---|---|---|---|---|
| LOCAL IP ADDRESS DEMANDING | 255.255.255.255 | 255.255.255.255 | 01H | IP PHONE NUMBER |
| LOCAL IP ADDRESS GIVING RESPONSE | 255.255.255.255 | LOCAL IP ADDRESS OF SERVER | 02H | LOCAL IP ADDRESS |
| GLOBAL IP ADDRESS DEMANDING | LOCAL IP ADDRESS OF PHONE DEVICE | LOCAL IP ADDRESS OF SERVER | 03H | IP PHONE NUMBER |
| GLOBAL IP ADDRESS GIVING RESPONSE | LOCAL IP ADDRESS OF PHONE DEVICE | LOCAL IP ADDRESS OF SERVER | 04H | GLOBAL IP ADDRESS |
| GLOBAL IP ADDRESS CHECKING DEMAND | GLOBAL IP ADDRESS OF SERVER | GLOBAL IP ADDRESS OF PHONE DEVICE OR OTHER SERVER | 05H | IP PHONE NUMBER |
| GLOBAL IP ADDRESS CHECKING RESPONSE | GLOBAL IP ADDRESS OF PHONE DEVICE OR OTHER SERVER | GLOBAL IP ADDRESS OF SERVER | 06H | GLOBAL IP ADDRESS OF CHECKING PARTNER OR "BUSY" |
| GLOBAL IP ADDRESS RETURNING DEMAND | LOCAL IP ADDRESS OF SERVER | LOCAL IP ADDRESS OF PHONE DEVICE | 07H | GLOBAL IP ADDRESS OF PHONE DEVICE |
| GLOBAL IP ADDRESS CHECKING NOTIFICATION | LOCAL IP ADDRESS OF PHONE DEVICE | LOCAL IP ADDRESS OF SERVER | 08H | |

INTERNET PROTOCOL PHONE SYSTEM AND CONTROL METHOD FOR INTERNET PROTOCOL PHONE SYSTEM

BACKGROUND OF THE INVENTION

1. Field of the Invention

The present invention relates to an internet protocol (IP) phone system and to a control method for an IP phone system which gives an IP address to an IP phone device and obtains the IP address from the IP phone device.

Priority is claimed on Japanese Patent Application No. 2004-078293, filed Mar. 18, 2004, the content of which is incorporated herein by reference.

2. Description of Related Art

In recent years, internet protocol (IP) phones which use voIP (voice over Internet Protocol) which is a technology for performing a voice telephone call on an IP network such as an Internet, an Intranet, or the like is quickly spreading.

Here, when the IP phone device which is connected to the Intranet (the local network) communicates with an IP phone device other than the IP phone device on the Internet, or with the other IP phone device on the other Intranet via the Internet, a transformation processing between a local IP address used in the Intranet and a global IP address used on the Internet occurs.

This is because the Internet and the Intranet use different IP address systems (spaces), and thereby the Internet and the Intranet manage the addresses on each network.

Usually, the transformation processing is performed at the boundary of the Intranet and the Internet by a router which relays packets.

The transformation processing is performed in order to effectively use the IP address resources, which are limited, and is a NAT (Network Address Translation) processing or a NAPT (Network Address Port Translation) processing which is the extended version thereof.

The specific NAT processing which is mentioned above is briefly explained as follows.

When the packets of the sound signal are transmitted from the first IP phone device which is connected to the Intranet to the second IP phone device which is connected to the other network via the Internet, the IP address which is located in the address section of the caller of the packets is rewritten from the local IP address of the first IP phone device to the IP address at the side of the Internet which is held in the router, that is, the global IP address.

Moreover, regarding the packets of the sound signal which are transmitted from the second IP phone device via the Internet, the IP address at the side of the Intranet which is held in the router is rewritten in the address section of the caller.

As mentioned above, excessive communication time will be taken and excessive delay will arise in the case of transmitting of the packets by rewriting processing of the IP address in the packets.

In order to avoid such a delay, as prior art in connection with the IP address transformation processing at the time of the voice telephone call, there is the method which is proposed in Japanese Unexamined Patent Application, First Publication No. 2001-156852 (Patent Document 1).

In this method, the router, which performs the NAT processing, becomes the broker for both parties to the call (the above-mentioned first and second IP phone devices) at the stage of the call setting of the telephone call, acts as the representative of the two parties, and has the two telephone call parties set so that the packets of the sound signal come to the place of the router.

Furthermore, the router rewrites the communication port number and the IP address to which the packets are transmitted on the basis of the IP address and the port number of the two telephone call parties which were acquired for the packets of the sound signal in the call setting stage by the router (for example, see Patent Document 1).

However, in this method, delay of the sound signal will arise because IP address conversion is performed for not only the packets of call setting but also for the packets of the sound signal.

Therefore, the above-mentioned prior art has a problem in that the real time performance of the sound signal is lost, as compared with the telephone call which is performed between the IP phone devices which hold the global IP addresses (that is, the case in which the IP address conversion is not performed.

As one of the solutions of this problem, it is possible to originally give the global IP addresses to all IP phones, and to make the IP address conversion unnecessary.

However, the global IP address is a limited resource, even if the address space uses IPv6 (IP version6) which is 128 bits.

For example, an action in which various controlling is attempted to perform for not only the IP phone but also the home electronic appliance from the exterior via the Internet occurs; therefore, in the case in which each global IP address is corresponded to each home electronic appliance at each home, a limit will also arise using IPv6.

That is, as the number of apparatuses which are connected to the IP network increase, the problem of the IP address running out has occurred.

The right of using of the global IP addresses has been already assigned to each country by IANA (Internet Assigned Numbers Authority).

Furthermore, the assigning processing which assigns the global IP addresses which are assigned by IANA to the company or the organization of each country by the management organization of each country is further performed in order to manage the global IP addresses in the country.

For example, in Japan, CORPORATION AGGREGATE JPNIC (Japan Network Information Center) performs the assigning processing in which the global IP addresses which are assigned to Japan are assigned to the applicants of a domestic global IP addresses.

Therefore, in the case in which an applicant who acquires a global IP address is an enterprise which affords the IP phone service to unspecified customers, the enterprise deployment will be projected within the number of the global IP addresses which are assigned from JPNIC to the enterprise.

However, as the number of the customers who use the IP phones increases, the demand for the global IP addresses which are used in order to connect the IP phones also increases.

As a result, because the number of the global IP addresses which are assigned is limited, as described above, there is a limit in assigning the global IP address to each IP phone.

SUMMARY OF THE INVENTION

The present invention was made in view of the above circumstances, objects of the present invention are to provide an internet protocol (IP) phone system and a control method for an IP phone system in which the IP address is changed so that delay does not occur, and it is possible for the limited global IP addresses to be effectively used.

In order to solve the above described problems, the present invention is an IP phone system in which a plurality of IP networks which are provided with IP address systems in which local IP addresses and global IP addresses differ are mutually connected, packets of sound signals are retransmitted via the IP networks, and a voice telephone call is performed, having an IP address translation device which is connected to the local IP network, gives the local IP address and the global IP address to a IP phone device, and obtains the local IP address and the global IP address from the IP phone device, in which when it is detected that the IP phone device which is connected to the local IP network enters a calling state, the IP address translation device gives the global IP address to the IP phone device thereof, and when it is detected that the call of the IP phone device is finished, the IP address translation device obtains the global IP address from the IP phone device.

The present invention is an control method for an IP phone system in which a plurality of IP networks which are provided with IP address systems in which local IP addresses and global IP addresses differ are mutually connected, packets of sound signals are retransmitted via the IP networks, and a voice telephone call is performed, having an IP address translation process in which one of the local IP address and the global IP address is given to an IP phone device which is connected to the local IP network by the IP address translation device, and one of the local IP address and the global IP address is obtained from the IP phone device by the IP address translation device, having a step of, in the case in which the IP phone device which is connected to the local IP network enters a calling state, giving the global IP address to the IP phone device thereof by the IP address translation device, and a step of, in the case in which a call of the IP phone device is finished, obtaining the global IP address from the IP phone device by the IP address translation device.

The present invention is an IP address translation server which is used for an IP phone system in which a plurality of IP networks which are provided with IP address systems in which local IP addresses and global IP addresses differ are mutually connected, packets of sound signals are retransmitted via the IP networks, and a voice telephone call is performed, in which the IP address translation server is connected to the local IP network, when it is detected that the IP phone device which is connected to the local IP network enters a calling state, the IP address translation server gives the global IP address to the IP phone device thereof, and when it is detected that the call of the IP phone device is finished, the IP address translation server obtains the global IP address from the IP phone device.

According to the present invention, the constitution that when it is in the waiting state which is not calling, the local IP address is given to the IP phone device, and when a transition from the waiting state to the calling state is performed, the global IP is given to the corresponding IP phone device is adopted, and therefore, it is not necessary for the IP address of the packets to be rewritten, in contrast with the conventional method, and thereby the delay of the transmitting and receiving of the packets of the sound signal does not occur, and because the predetermined number of global IP address are used only when a large number of IP phone devices use the global IP addresses, resources of the global IP address can be effectually used.

The present invention is an IP phone system in which the IP address translation device is connected to a network of the global IP address, a look-up table between a phone number of the IP phone device, and the local IP address and the global IP address is provided, when an access demand is entered from an other IP address translation device which is set in the network of the global IP address to the IP phone device, the IP address translation device makes reference to the look-up table, in the case in which it is detected that the global IP address is not given to the IP phone device to which the access is demanded, the IP address translation device gives the global IP address to the IP phone device thereof, and rewrites the IP address in the look-up table.

The present invention provides a control method for an IP phone system in which, in the IP address translation process, an IP address translation device is connected to both networks which are the network of the global IP address and the network of the local IP address, the look-up table of the phone number of the IP phone device and the local IP address is used, when the call setting is demanded from the other IP phone device which is set in the network of the global IP address to the IP phone device, the contrast is checked, in the case in which it is detected that the global IP address is not given to the IP phone device which is checked, the notification of having been checked is performed, while the global IP address is given, and the IP address of the look-up table is rewritten, and after the call is finished, the global IP address is obtained from the IP phone device, and the look-up table is rewritten to the local IP address.

According to the present invention, because the look-up table of each IP phone device and the IP address (the local IP address and the global IP address) is provided, in the case in which the call setting is demanded, the IP address translation device can immediately determine whether the corresponding IP phone device is busy or not by referring to the look-up table.

That is, if the global IP address is given to the IP phone device, it is detected that it is busy, and if the local IP address is given to the IP phone device, it can be detected that it is in a waiting state, and thereby the global IP address can be immediately given.

The present invention is an IP phone system, in which when the IP phone device is connected to the local IP network, the IP phone device demands the local IP address for the IP address translation device, and acquires the local IP address, when the IP phone device detects off-hook of a phone receiver, after the IP phone device demanded the giving of the global IP address for the IP address translation device, and acquired the global IP address, the IP phone device performs a call setting, and the transmitting and the receiving of the packets of the sound signal with the IP phone device of the other party, and when the IP phone device detects on-hook of the phone receiver, the IP phone device outputs a returning demand of the global IP address to the IP address translation device.

The present invention is a control method for an IP phone system, in which when the IP phone device is connected to the local IP network, the IP phone device demands the local IP address for the IP address translation device, and acquires the local IP address, when the IP phone device detects off-hook of a phone receiver, after the IP phone device demanded the giving of the global IP address for the IP address translation device, and acquired the global IP address, the IP phone device performs a call setting, and a transmitting and a receiving of the packets of the sound signal with the IP phone device of the other party, and when the IP phone device detects on-hook of the phone receiver, the IP phone device outputs a returning demand of the global IP address to the IP address translation device.

According to the present invention, the IP phone device detects on-hook or off-hook, and outputs the demand of the global IP address and the returning demand of the global IP address to the IP address translation device, and thereby the IP address translation device can give the global IP address in real time, and the IP address translation device can obtain the global IP address in real time, because the global IP address is not in the state of being given to the IP phone device during the excessive time, it is possible to effectively use resources.

As explained above, according to the present invention, in the IP phone system and the control method for IP phone system, because the global IP address is given to the IP phone device just before becoming the calling state, and the global IP address is obtained just after the call is finished, it is not necessary for NAT processing to be performed for the packets of the sound signal, and it is possible for the IP phone device to communicate with the other IP phone device via a plurality of IP networks. Therefore, because the delay in transmitting and receiving does not occur, as compared with the conventional method, it is possible for call without a sense of disjointedness to be performed between the users who use the IP phone devices.

Moreover, according to the present invention, because the global IP address is not fixedly given to each IP phone device, it is possible for the limited resource of the global IP addresses to be effectively used.

DETAILED DESCRIPTION OF THE INVENTION

The present invention is an internet protocol (IP) phone system in which a plurality of IP networks which are provided with IP address systems in which local IP addresses and global IP addresses differ are mutually connected, packets of sound signals are retransmitted via the IP networks, and a voice telephone call is performed, and having an IP address translation portion which is connected to the local IP network, gives the local IP address and the global IP address to an IP phone device, and obtains the local IP address and the global IP address from the IP phone device. When the IP phone device is connected to the local IP network, the IP address translation portion thereof gives the local IP address to the IP phone device thereof, when the transitioning from the waiting state to the calling state is detected, the global IP address is given to the IP phone device, and when it is detected that the call of the IP phone device is finished, the global IP address is obtained from the IP phone device.

Hereinafter, the IP phone system according to an embodiment of the present invention is explained with reference to the figures.

Figure 1:
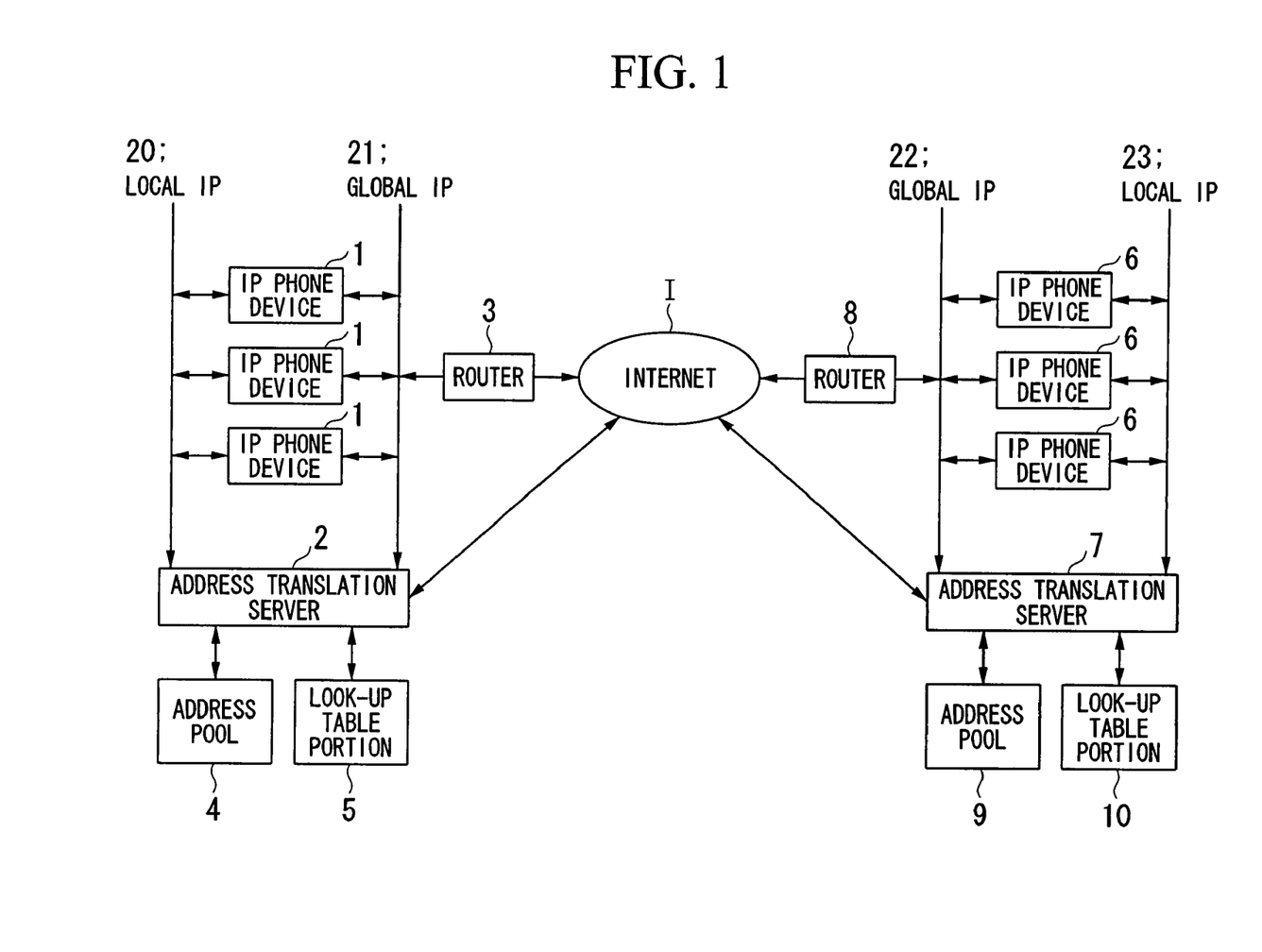
FIG. 1 is a block diagram which shows an example of a constitution of an internet protocol (IP) phone system according to an embodiment of the present invention.

FIG. 1 is a block diagram which shows an example of a constitution of a logic network of the IP phone system according to the present embodiment.

In this figure, an IP phone device 1 is connected to an address translation server 2 via a local IP network 20 or a global IP network 21.

Similarly, an IP phone device 6 is connected to an address translation server 7 via a local IP network 23 or a global IP network 22.

The global IP network 21 and the global IP network 22 are connected with each other via a router 3, an Internet I, and a router 8.

Figure 7:
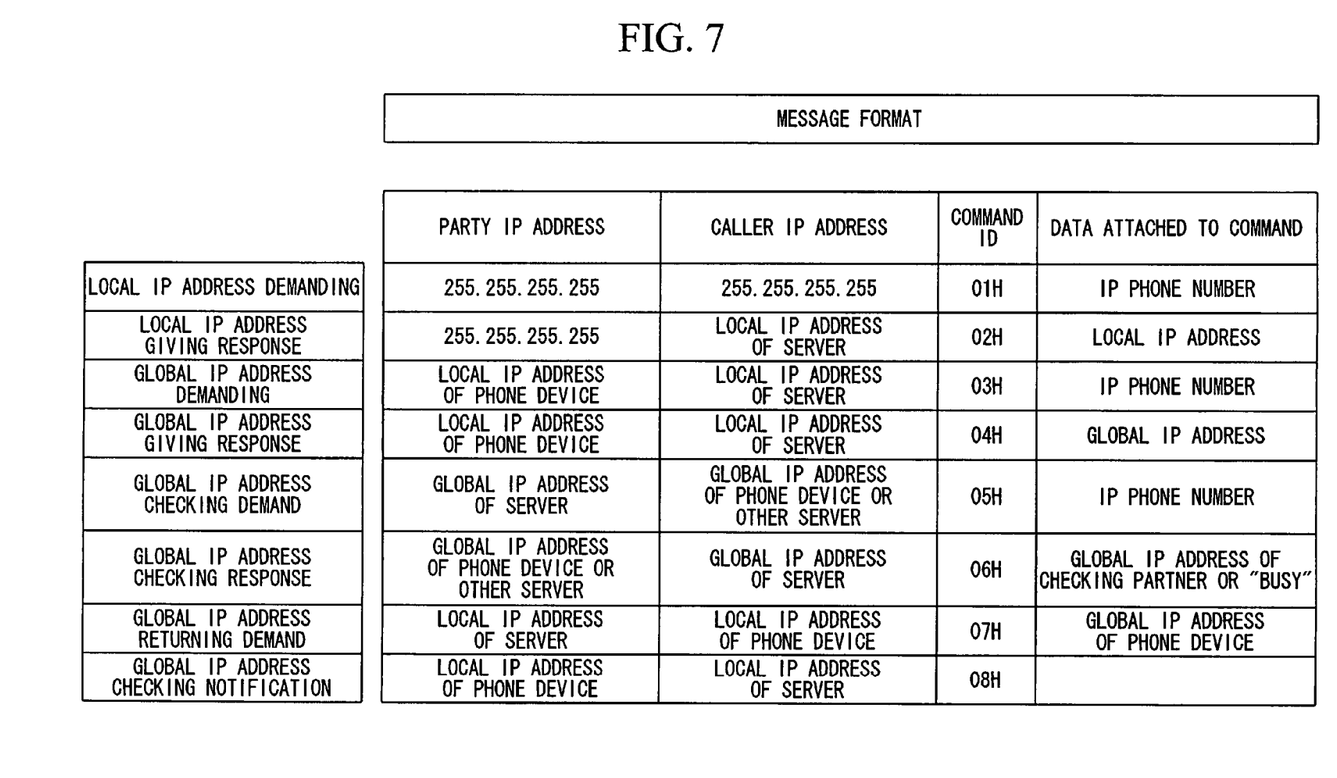
FIG. 7 is a table of a control signal which is used in the IP phone system in FIG. 1.

Here, the address translation server 2 uses the local IP address for exchanging the control signal (See FIG. 7) with the IP phone device 1, similarly, the address translation server 7 uses the local IP address for exchanging the control signal (See FIG. 7) with the IP phone device 6.

When the IP phone device 1 is newly connected to the local IP network 20, the IP phone device 1 outputs a local IP address demand to the address translation server, when off-hook is detected, the IP phone device outputs a global address demanding to the address translation server 2, and when on-hook is detected, the IP phone device outputs a global address returning demand to the address translation server 2.

The IP phone device 6 performs the same processing to the address translation server 7 (the IP phone device 6 is connected to the local IP network 23).

When the address translation server 2 is demanded to give the local IP address, the address translation server 2 extracts the unused local IP address from the local IP address pool in the address pool 4, coordinates the phone number of the demanding IP phone device 1 and the local IP address which is extracted, and writes them in the look-up table portion 5.

Moreover, when the address translation server 2 is demanded to give the global IP address, the address translation server 2 extracts the unused global IP address from the global IP address pool in the address pool 4, coordinates the phone number of the demanding IP phone device 1 and the global IP address which is extracted, and writes them in the look-up table portion 5.

On the other hand, when the global IP address returning demand is input, the address translation server 2 deletes the global IP address corresponding to the phone number of the demanding IP phone device from the look-up table portion 5, and returns the deleted global IP address to the global IP address pool.

Figure 2A:
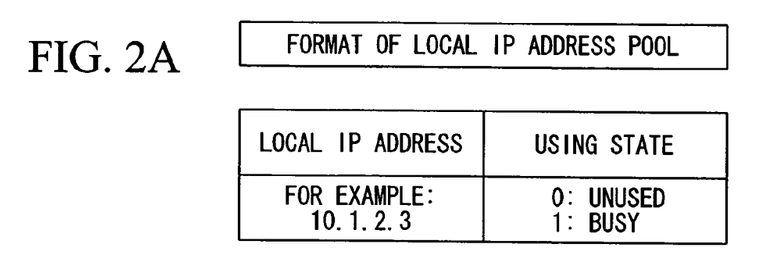
FIGS. 2A and 2B are tables which show examples of constitutions of address pools 4 and 9 in FIG. 1.
Figure 2B:
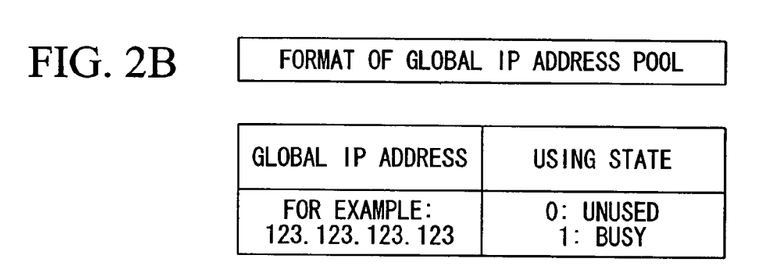

In the address pools 4 and 9, the local IP address pool which is shown in FIG. 2A, and is the table in which a state flag which shows the using state is given to each of a plurality of local IP addresses, and the global IP address pool which is shown in FIG. 2B, and is the table in which a state flag which shows the using state is given to each of a plurality of global IP addresses are stored.

Here, regarding both the local IP address pool and the global IP address pool, it is shown that when the state flag is "0", these are in the state of being unused, and it is possible for the state flag to be given, and when the state flag is "1", these are in the state of being used, it is impossible for the state flag to be given. Regarding the state flag thereof, the look-up table 5 is rewritten by the address translation server 2, and the look-up table 10 is rewritten by the address translation server 7.

Figure 3:
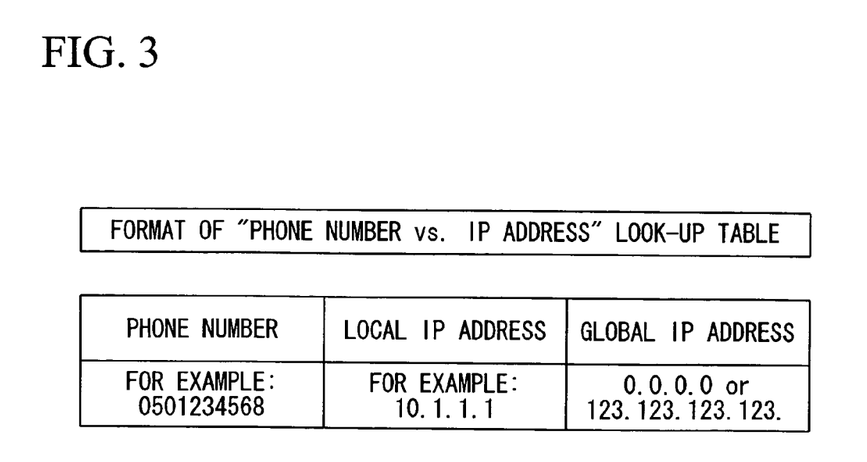
FIG. 3 is a table which shows an example of a constitution of look-up table portions and 1 in FIG. 1.

As shown in FIG. 3, the correspondence of the phone number of each IP phone device, and the local IP address and the global IP address (for example, 123.123.123.123) is stored in the look-up table portions 5 and 10.

Figure 4:
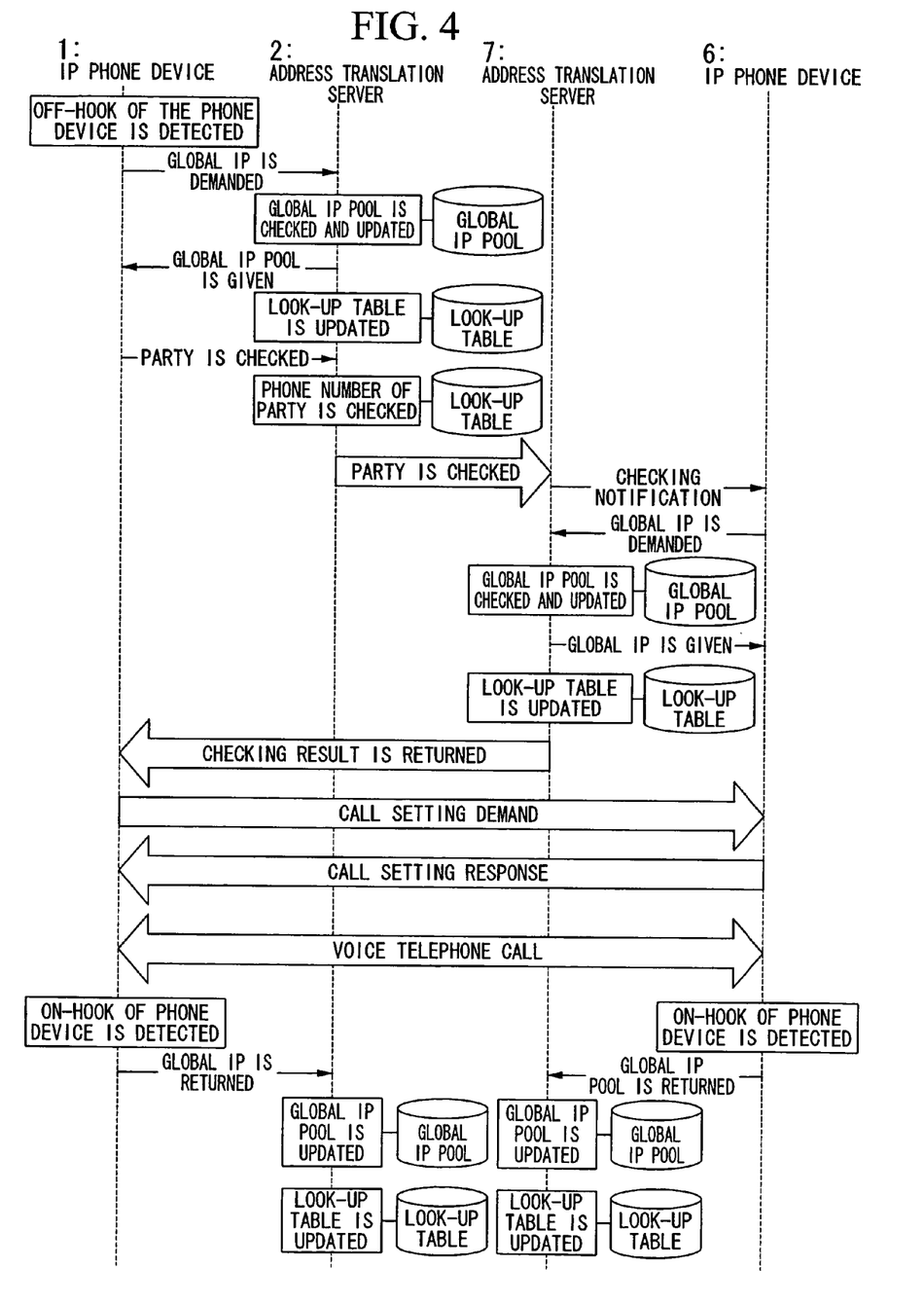
FIG. 4 is a sequence view which shows an example of an operation of the IP phone system.
Figure 5:
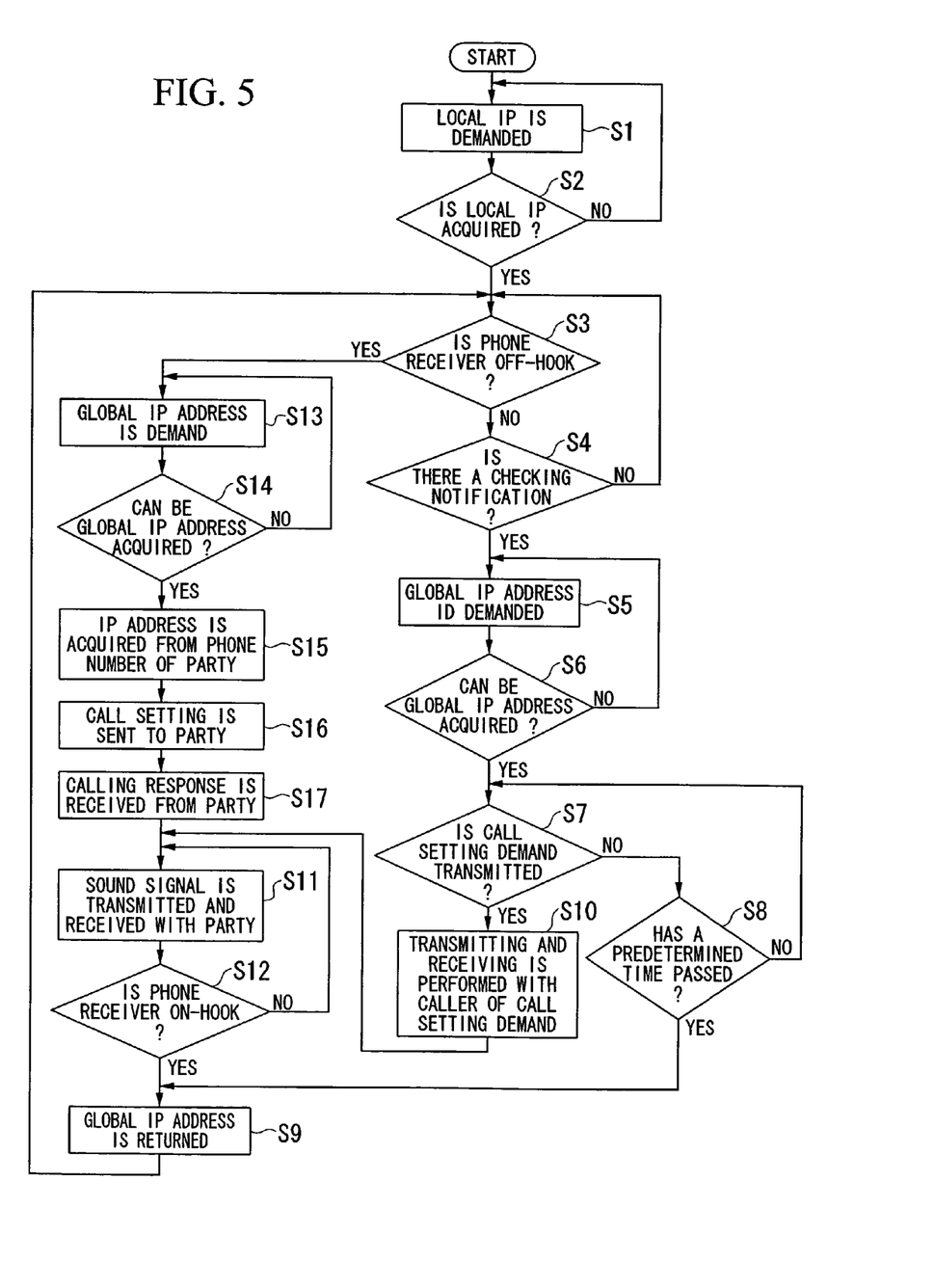
FIG. 5 is a flowchart for explaining an example of an operation of the IP phone device in FIG. 1.

Next, the operation of the IP phone device according to the present embodiment is explained, using FIG. 1, FIG. 4, and FIG. 5.

FIG. 4 is a schematic diagram which shows the sequence showing the correspondence of the processing of the IP phone devices 1 and 6 and the processing of the address translation servers 2 and 7 in the IP phone system. FIG. 5 is a flowchart which explains an example of an operation of the IP phone device. In the following explanation, an example of the operation of the IP phone device 1 is explained.

When the IP phone device 1 is connected to the local IP network 20, the IP phone device 1 outputs the local IP address demanding to the address translation server 2 (Step S1).

Furthermore, the IP phone device 1 returns the processing to Step S1 until the IP address giving response is input from the address translation server 2, and outputs the local IP address demanding, on the other hand, when the local IP address demanding is input, the processing is advanced to Step S3 (Step S2).

Next, the IP phone device 1 detects whether the phone receiver is in the state of being on or off, that is, off-hook or not (Step S3).

Furthermore, when the IP phone device 1 detects that it is not off-hook, the operation is set to the receiving waiting state, and it is detected whether the checking global IP address checking notification which shows the access demand for the phone number of the IP phone device 1 is input from the address translation server 2 or not (Step S4).

At this time, when the IP phone device 1 detects that the global IP address checking notification is not input, the processing is returned to Step S3, and the processing of Step S3 is repeated.

On the other hand, the IP phone device 1 detects that the global IP address checking notification is input from the address translation server 2, the IP phone device 1 outputs the global IP address demanding to the address translation server 2 (Step S5).

Next, the IP phone device 1 detects whether the global IP address giving response which shows that the global IP address has been acquired is input from the address translation server 2 or not (Step S6).

At this time, when the IP phone device 1 detects that the global IP address demanding is not input, the processing is returned to Step S5, and the processing of Step S5 is repeated.

On the other hand, when the IP phone device 1 detects that the global IP address giving response has been input from the address translation server 2, the IP phone device 1 detects whether the call setting demand is input from the other IP phone device (for example, IP phone device 6) or not (Step S7).

Furthermore, when the IP phone device 1 cannot detect that the call setting demand which demands the calling is input, the IP phone device 1 detects whether a predetermined time (for example, 5 minutes) which is previously set passes, in the case in which the time thereof has not passed, the processing returns to Step S7, and the processing of Step S7 is repeated (Step S8).

On the other hand, when the IP phone device 1 detects that a predetermined time has passed, the IP phone device 1 outputs the global IP address returning demand to the address translation server 2 in order to return the global IP address, and returns the global IP address which is given once, and returns the processing to Step S3 (Step S9).

That is, the IP phone device 1 waits for the input of the call setting demand from the other IP phone device which is the side of dispatch during the term of the predetermined time.

On the other hand, when the IP phone device 1 can detect that the call setting demand is input, the IP phone device 1 outputs the call setting response which shows the reception of the call setting demand (Step S10), performs the transmitting and the receiving of the packets of the sound data with the other IP phone device, and performs the calling processing (Step S11).

Furthermore, the IP phone device 1 detects whether the phone receiver is put on the predetermined position, that is, it is on-hook, and in the case of not being on-hook, the processing is returned to Step S11, and the calling processing is continued (Step S12).

At this time, in the case in which the IP phone device 1 detects on-hook, the processing is advanced to Step S9, the IP phone device 1 performs the returning processing of the global IP address, and returns to the receiving waiting state again.

Next, in Step S3, when the IP phone device 1 detects that the phone receiver is on, that is, it is off-hook, the IP phone device 1 sets the operation to the dispatch state, and outputs the global IP address demanding to the address translation server 2 (Step S13).

Furthermore, the IP phone device 1 detects whether the global IP address giving response which shows that the global IP address can be acquired is input from the address translation server 2 or not (Step S14).

At this time, when the IP phone device 1 detects that the global IP address giving response is not input, the processing is returned to Step S13, and the processing of Step S13 is repeated.

On the other hand, when the IP phone device detects that the global IP address giving response is input from the address translation server 2, the IP phone device 1 demands the phone number of the other IP phone device (for example, IP phone device 6) of the party and the global IP address corresponding to the phone number thereof, and acquires the global IP address (Step S15).

Next, the IP phone device 1 sends the acquired global IP address, that is, the IP phone device 1 sends the call setting demand to the other IP phone of the party (Step S16). Furthermore, the IP phone device 1 receives the call setting response from the other IP phone device of the party (Step S17), and the IP phone device 1 performs the transmitting and the receiving of the packets of the sound data with the IP phone of the other party (Step S11).

Figure 6:
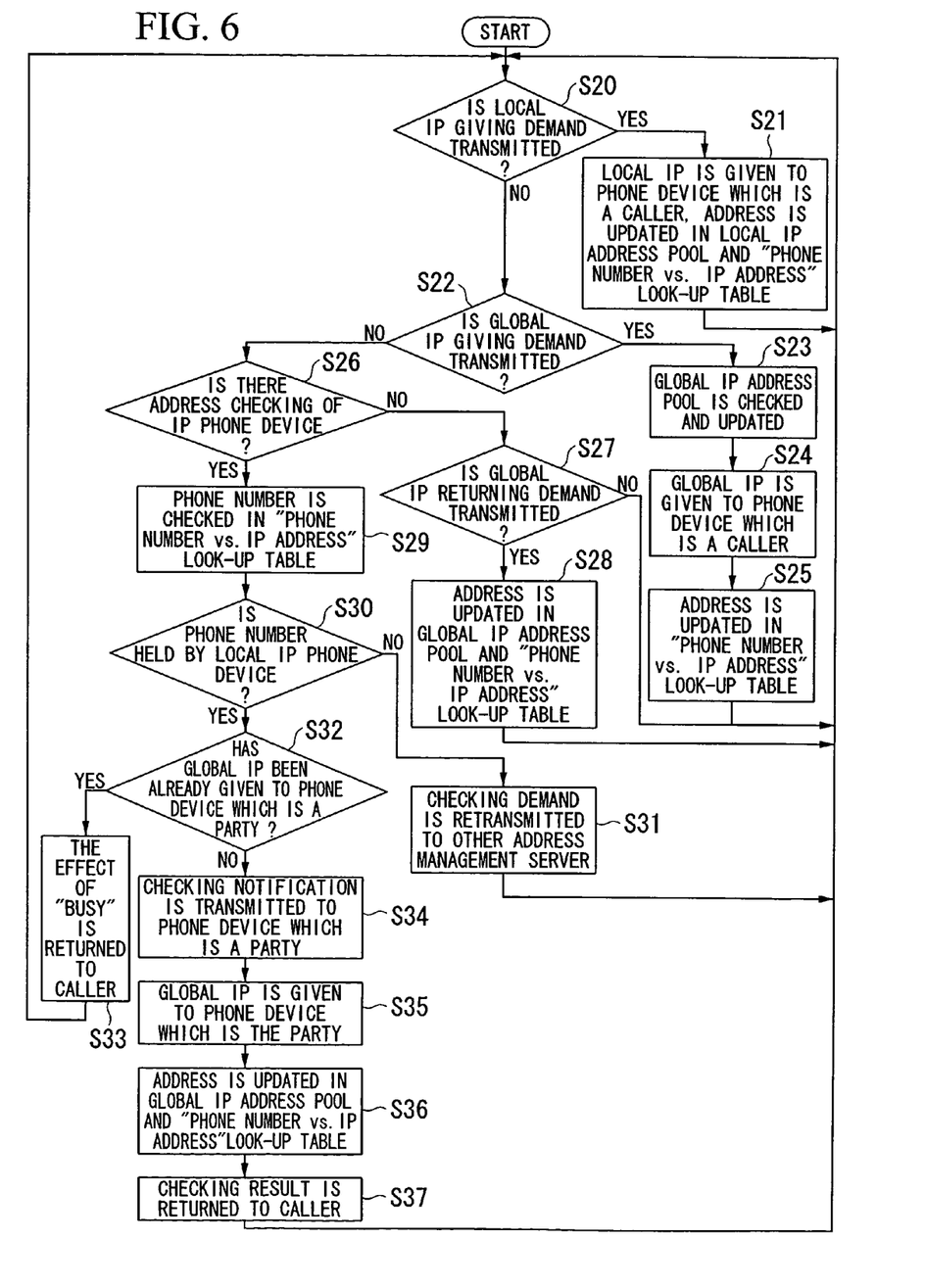
FIG. 6 is a flowchart for explaining an example of an operation of an address translation server in FIG. 1.

Next, the operation of the IP phone device according to a present embodiment is explained using FIG. 1, FIG. 4, and FIG. 6.

FIG. 6 is a flowchart which explains an example of an operation of the address translation server. In the following explanation, the example of the operation of the address translation server 2 is explained.

The address translation server 2 detects whether the local IP address demanding is input from the IP phone device 1 or not, and when the local IP address demanding is detected, the address translation server 2 extracts the unused local IP address from the local IP address pool, and writes the local IP address thereof in a look-up table of a look-up table portion 5 corresponding to the phone number of the IP phone device 1, and thereby the address translation server 2 gives the local IP address to the IP phone device 1 from which the call is demanded, and the processing is returned to Step S20 in order to receive the local IP address demanding from the other IP phone device 1 (Step S21).

At this time, the address translation server 2 rewrites the state flag of the local IP address which is given to the IP address phone device from "0" to "1", and updates the state flag thereof.

On the other hand, the local IP address demanding is not detected in Step S20, the address translation server 2 detects whether the global IP address demanding is input from the IP phone device 1 (Step S22), when the global IP address demanding is detected, the address translation server 2 extracts the unused global IP address from the global IP address pool, and rewrites the state flag of the global IP address which is given to the IP address phone device from "1" to "0", and updates the state flag thereof (Step S23).

Furthermore, the address translation server 2 writes the extracted global IP address in the look-up table of the look-up table portion 5 corresponding to the phone number of the IP phone device 1, and thereby the address translation server 2 gives the global IP address to the IP phone device 1 from which the call is demanded, and returns the processing to Step S20 (Steps S24 and S25).

On the other hand, when the global IP address demanding is not detected in Step S20, the address translation server 2 determines whether the global IP address checking demand is input from the other address translation server (for example, the address translation server 7) or not (Step S26), in the case in which it is detected that the global IP address checking demand is not input, the address translation server 2 determines whether the global IP address returning demand is input from the IP phone device 1 (Step S27).

At this time, when the address translation server 2 detects that the global IP address returning demand is not input, the address translation server 2 returns the processing to Step S20.

On the other hand, when the address translation server 2 detects that the global IP address returning demand is input, the address translation server 2 deletes the global IP address corresponding to the phone number of the IP phone device 2 from which the call is demanded, and performs the returning processing of the global IP address which has been given. Moreover, the address translation server 2 rewrites the state flag of the global IP address in which the returning processing is performed from "1" to "0" in the global IP address pool, updates the state flag thereof, and returns the processing to Step S20 (Step S28).

Moreover, when the address translation server 2 detects that the global IP address checking demand is input in Step S26, the address translation server 2 checks the phone number attached to the demand thereof with the phone number which is shown in the look-up table portion 5 (Step S29).

Furthermore, the address translation server 2 detects whether the attached phone number is stored in the look-up table portion 5 or not (Step S30).

Next, when the address translation server 2 detects that the attached phone number is not stored in the look-up table portion 5, the address translation server 2 retransmits the global IP address checking demand to the other address translation server (for example, the address translation server 7), and returns the processing to Step S20 (Step S31).

Moreover, when the address translation server 2 detects that the attached phone number is stored in the look-up table portion 5 in Step S30, the address translation server 2 determines whether the global IP address corresponding to the phone number thereof is written (is given) or not (Step S32).

Furthermore, when the address translation server 2 detects that the global IP address corresponding to the phone number is given, the address translation server 2 transmits the data which shows "busy" to the address translation server from which the checking is demanded, and returns the processing to Step S20 (Step S33).

On the other hand, when the address translation server 2 detects that the global IP address is not given corresponding to the phone number, the address translation server 2 transmits the global IP address checking notification to the IP phone device of the phone number thereof (Step S34).

Next, when the address translation server 2 receives the global IP address demanding from the IP phone device 1 in regard to the global IP address checking notification for the IP phone device 1, the address translation server 1 extracts the unused global IP address from the global IP address pool, rewrites the state flag of the global IP address which is given to the IP address phone device from "0" to "1", and updates the state flag thereof (Steps S35 and S36).

Furthermore, the address translation server 2 writes the extracted global IP address to the look-up table of the look-up table portion 5 corresponding to the phone number of the IP phone device 1, and thereby the address translation server 2 gives the global IP address to the IP phone device 1 from which the demand is transmitted (Steps S35 and S36).

Thereby, the address translation server 2 returns the global IP address which is attached to the phone number of the IP phone device 1 to the address translation server from which the checking is demanded (Step S37).

In addition, the program for carrying out the function of the address translation server in FIG. 1 is stored in the recording medium which can be read by the computer, and the program which is stored in the recording medium thereof is read in the computer system, and is carried out, and thereby the processing of the address translation server (the processing of giving or obtaining the IP address to the IP phone device) may be performed. In addition, OS or hardware such as a peripheral device or the like is included in "computer system" as described above. Moreover, a WWW system which is provided with a homepage offering environment (or displaying environment) is also included in the "computer system". Moreover, "the recording medium which can be read by the computer" is the mobile medium such as a flexible disk, a magneto-optical disc, ROM, CD-ROM, or the like, or the memorizing apparatus such as the hardware which is built in the computer system, or the like. Furthermore, "the recording medium which can be read by the computer" includes that which can holds the program during a certain time such as the volatile memory (RAM) at the inside of the computer system which becomes the server or the client in the case in which the program is transmitted via the network such as the Internet or the like, or the communication line such as the telephone line or the like.

Moreover, the above-mentioned program may be transmitted from the computer system which stores the program thereof in the memorizing apparatus or the like to the other computer via the transmission media or by the transmission wave in the transmission media. Here, "transmission media" which transmits the program is the media which has the function of transmitting the information such as the network (the communication net) such as the Internet or the like, or the communication line (the information line) such as a telephone line or the like. Moreover, the above-mentioned program may actualize a part of the above mentioned function. Furthermore, the above-mentioned function may be realized by combining with the program which has been already recorded in the computer system, what is called, a difference file (a difference program).

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An Internet Protocol (IP) phone system in which packets of call setting or sound signal are transmitted, and a voice telephone call is performed, comprising:
   a local IP network which has a different IP address system from a global IP network, and is mutually connected with another local IP network via the global IP network;
   an IP phone device which has a phone number, and is connected to the local IP network; and
   an IP address translation device which is connected to the local IP network, assigns a local IP address and a global IP address corresponding to the phone number of the IP phone device, and retrieves the local IP address and the global IP address assigned to the phone number of the IP phone device, wherein:
   when a transition from a waiting state to a calling state of the IP phone device is detected, the IP address translation device assigns the global IP address corresponding to the phone number of the IP phone device thereto, in the calling state, the IP phone device transmits and receives packets of call setting or sound signal based on the global IP address assigned to the phone number of the IP phone device with another IP phone device provided in another local IP network, and when the calling state is finished, the IP address translation device retrieves the global IP address assigned to the phone number of the IP phone device.

2. The IP phone system according to claim 1, wherein:

the IP address translation device is connected to the global IP network, a look-up table portion which stores and rewrites a correspondence relationship between the phone number of the IP phone device, and the local IP address and the global IP address, is further provided so as to connect with the IP address translation device, when another IP address translation device which is connected to another local IP network via the global IP network demands an access phone number of the IP phone device, the IP address translation device refers to the correspondence relationship at the time stored in the look-up table portion, and when the global IP address is not assigned to the phone number of the IP phone device to which the access is demanded, the IP address translation device assigns the global IP address corresponding to the phone number of the IP phone device based on the correspondence relationship at the time stored in the look-up table portion, and rewrites the correspondence relationship in the look-up table portion.

3. The IP phone system according to claim 1, wherein:

in the waiting state of the IP phone device, the IP address translation device assigns a local IP address corresponding to the phone number of the IP phone device thereto, when the IP phone device detects an off-hook of a phone receiver of the IP phone device at the transition, the IP address translation device assigns the global IP address corresponding to the phone number of the IP phone device thereto and retrieves the local IP address corresponding to the phone number of the IP phone device therefrom, and when the IP phone device detects an on-hook of the phone receiver of the IP phone device and the calling state of the IP phone device is finished, the IP address translation device retrieves the global IP address assigned to the phone number of the IP phone device.

4. A control method for an Internet Protocol (IP) phone system in which packets of call setting or sound signal are transmitted, and a voice telephone call is performed, the IP phone system including a local IP network which has a different IP address system from a global IP network and is mutually connected with another local IP network via the global IP network, a IP phone device which has a phone number that is connected to the local IP network, and an IP address translation device which assigns a local IP address and a global IP address corresponding to the phone number of the IP phone device, and retrieves the local IP address and the global IP address assigned to the phone number of the IP phone device that is connected to the local IP network, the control method comprising:

a step of, in the case in which a transition from a waiting state to a calling state of the IP phone device, assigning a global IP address corresponding to the phone number of the IP phone device thereto by the IP address translation device;

a step of, in the calling state, transmitting and receiving the packets of call setting or sound signal based on the global IP address assigned to the phone number of the IP phone device with another IP phone device provided in another local IP network; and a step of, in the case in which the calling state is finished, retrieving the global IP address assigned to the phone number of the IP phone device by the IP address translation device.

5. The control method for an IP phone system according to claim 4, wherein in the waiting state, when another IP address translation device which is connected to another local IP network via the global IP network demands an access phone number of the IP phone device, and when the global IP address is not assigned to the phone number of the IP phone device to which the access is demanded, the local IP address is retrieved from and the global IP address is assigned to the phone number of the IP phone device based on a look-up table which is a table determining a correspondence relationship between the phone number of the IP phone device, and the local IP address and the global IP address.

6. The control method for an IP phone system according to claim 4, wherein:

in the waiting state of the IP phone device, the IP address translation device assigns the local IP address corresponding to the phone number of the IP phone device thereto, when the IP phone device detects an off-hook of a phone receiver of the IP phone device at the transition, the IP address translation device assigns the global IP address corresponding to the phone number of the IP phone device thereto and retrieves the local IP address corresponding to the phone number of the IP phone device therefrom, and when the IP phone device detects an on-hook of the phone receiver of the IP phone device and the calling state of the IP phone device is finished, the IP address translation device retrieves the global IP address assigned to the phone number of the IP phone device.

7. An Internet Protocol (IP) address translation server which is used for an IP phone system in which packets of call setting or sound signal are transmitted, and a voice telephone call is performed, the IP phone system including a local IP network which has a different IP address system from a global IP network and is mutually connected with another local IP network via the global IP network, and a IP phone device which has a phone number that is connected to the local IP network, wherein:

the IP address translation server is connected to the local IP network, assigns a local IP address and a global IP address corresponding to the phone number of the IP phone device, and retrieves the local IP address and the global IP address assigned to the phone number of the IP phone device, when a transition from a waiting state to a calling state of the IP phone device is detected, the IP address translation device assigns the global IP address corresponding to the phone number of the IP phone device thereto, and when the calling state is finished, the IP address translation server retrieves the global IP address assigned to the phone number of the IP phone device.

* * * * *